Oct. 18, 1960    F. J. GALASSI    2,956,688
SHELVING ASSEMBLY
Filed Nov. 20, 1958    6 Sheets-Sheet 1

INVENTOR.
Francis J. Galassi
BY Harold E. Cole
Attorney

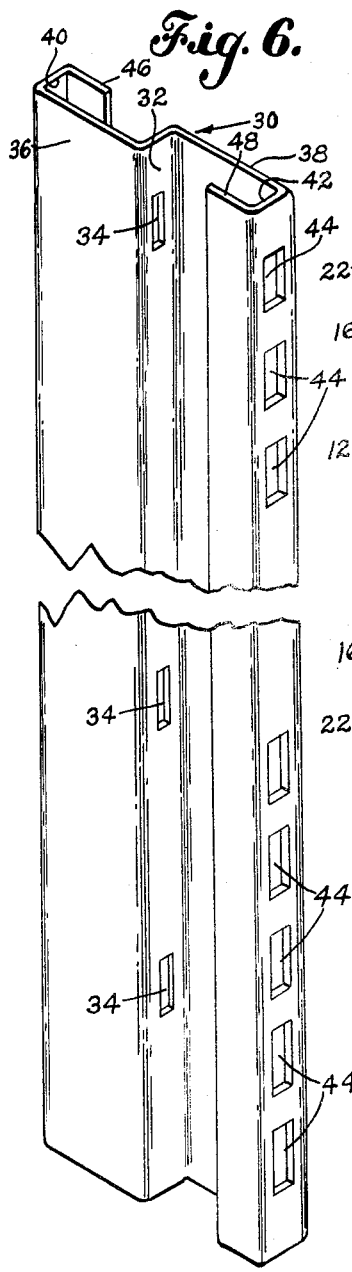
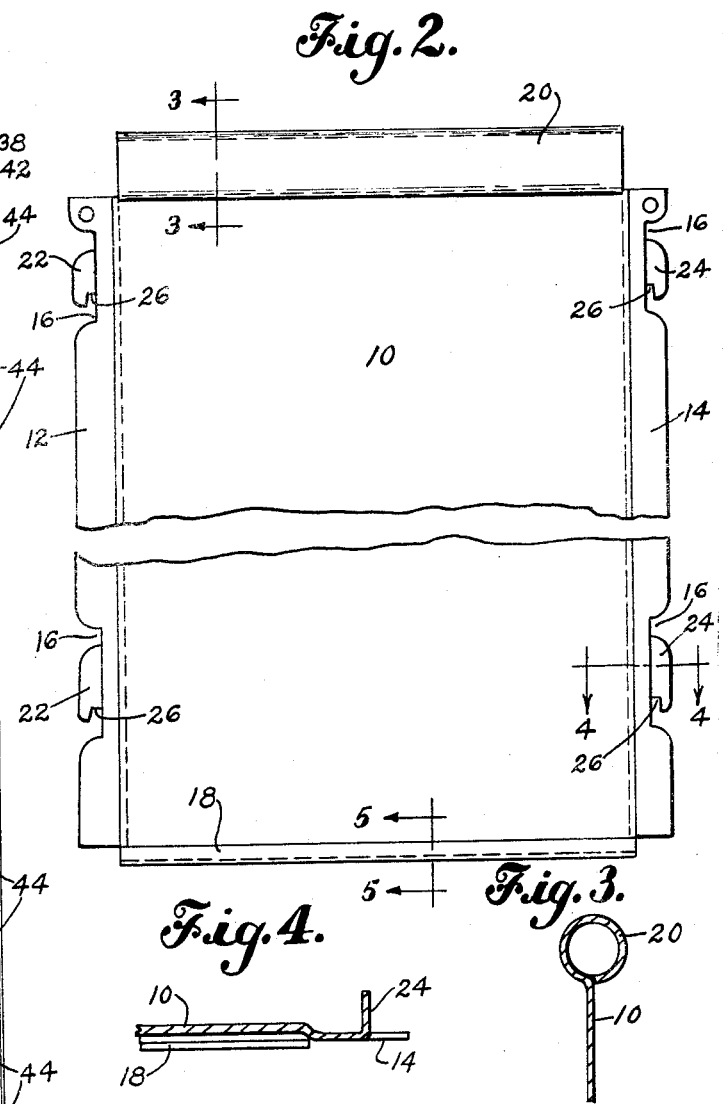
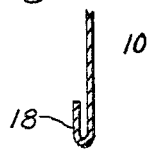

Oct. 18, 1960 F. J. GALASSI 2,956,688
SHELVING ASSEMBLY
Filed Nov. 20, 1958 6 Sheets-Sheet 3
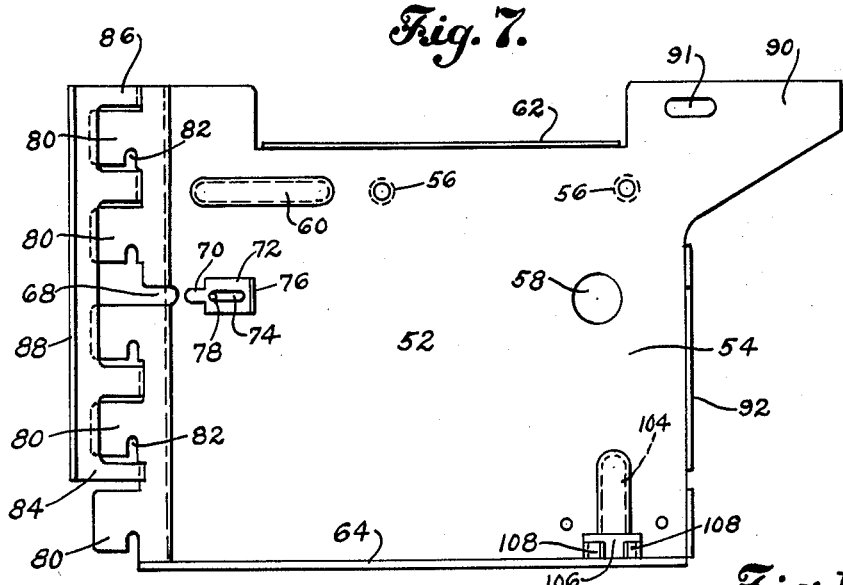
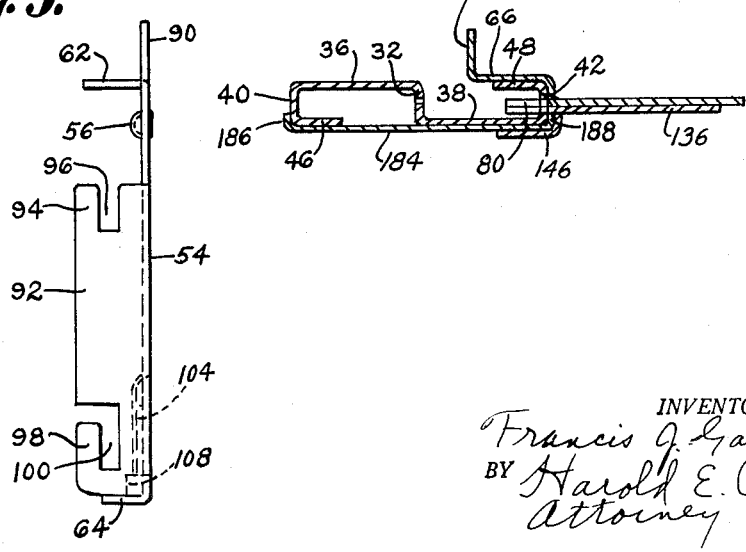
INVENTOR.
Francis J. Galassi
BY Harold E. Cole
Attorney

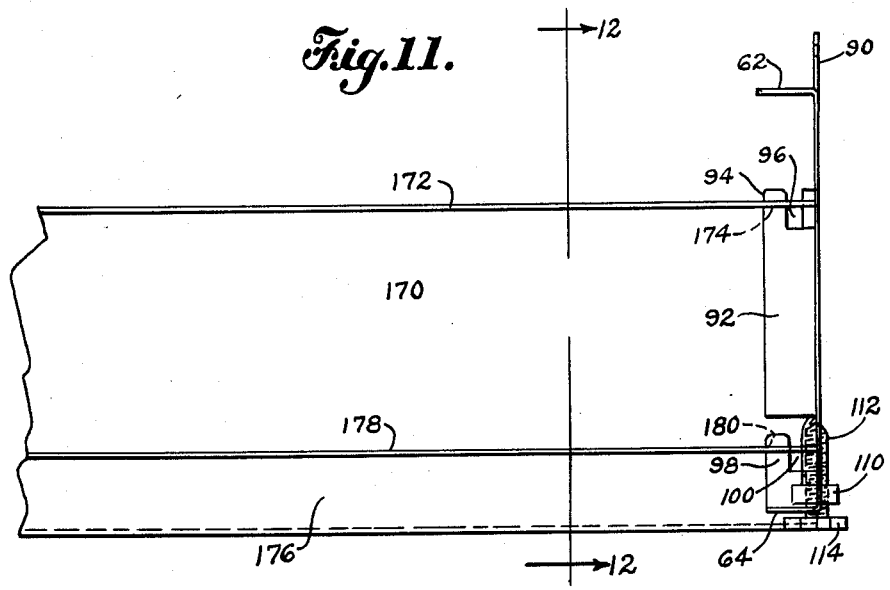
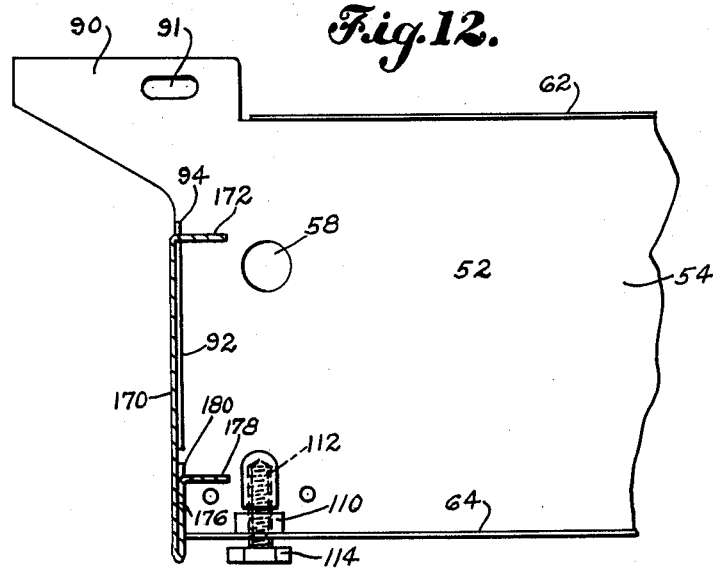

Oct. 18, 1960  F. J. GALASSI  2,956,688
SHELVING ASSEMBLY
Filed Nov. 20, 1958  6 Sheets-Sheet 5
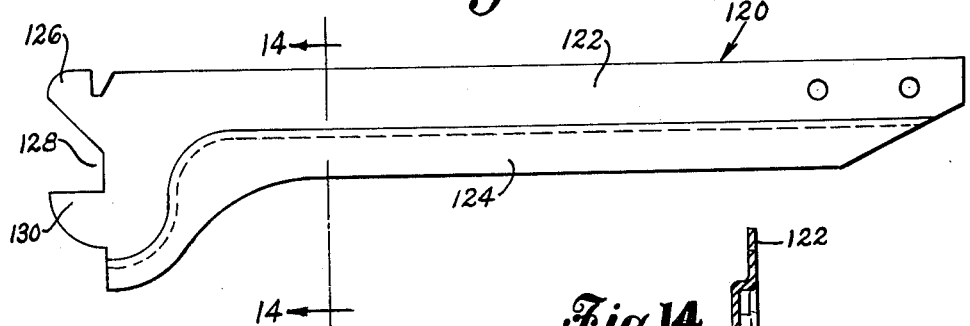
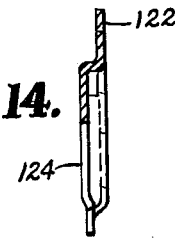
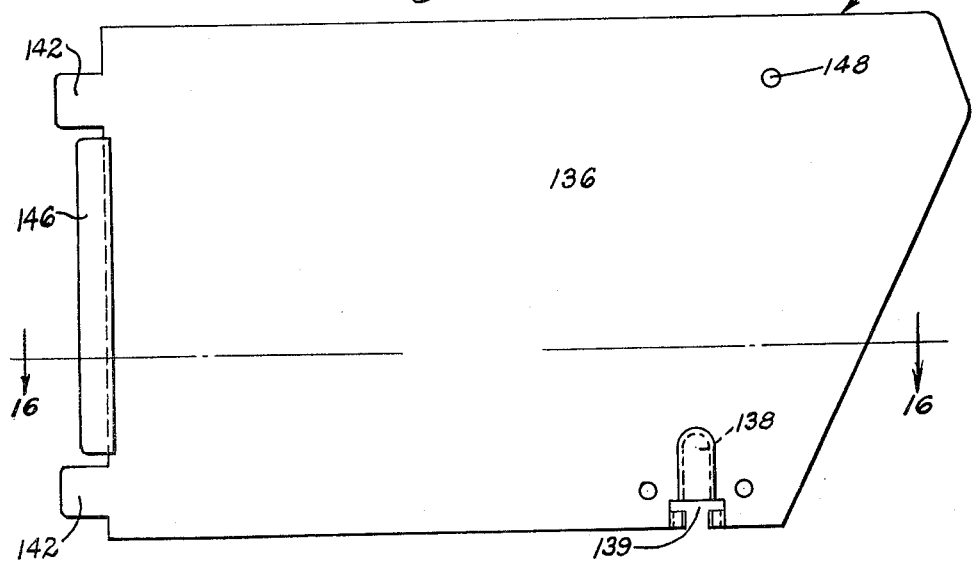
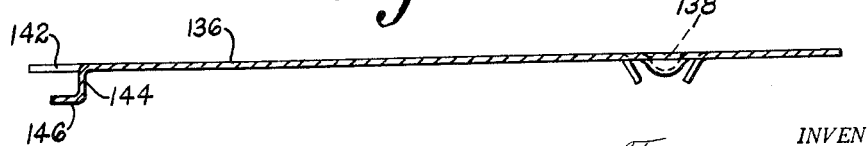
INVENTOR.
Francis J. Galassi
BY Harold E. Cole
Attorney Oct. 18, 1960
F. J. GALASSI
2,956,688
SHELVING ASSEMBLY
Filed Nov. 20, 1958
6 Sheets-Sheet 6
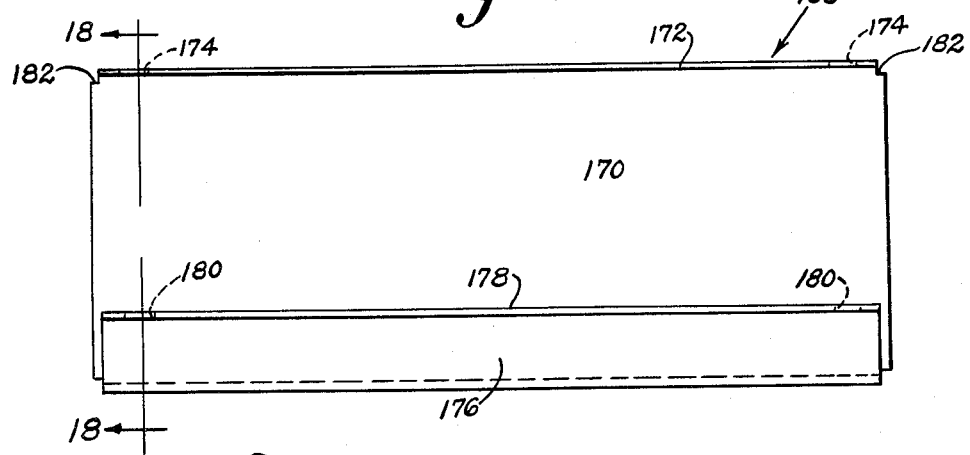
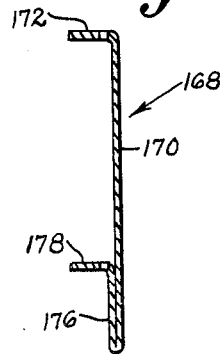 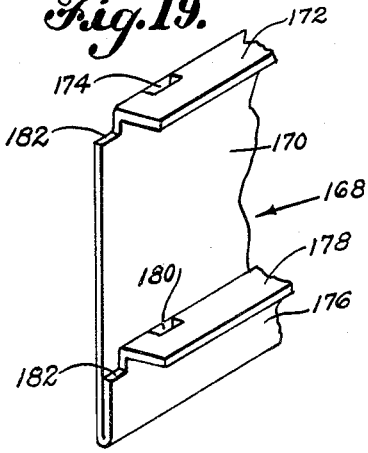
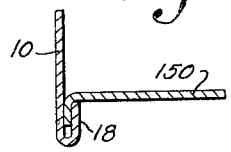
INVENTOR.
Francis J. Galassi
BY Harold E. Cole
Attorney United States Patent Office 2,956,688
Patented Oct. 18, 1960

2,956,688

SHELVING ASSEMBLY

Francis J. Galassi, Boston, Mass., assignor to
Russell E. Maintain, Newton, Mass.

Filed Nov. 20, 1958, Ser. No. 775,301

19 Claims. (Cl. 211—148)

This invention relates to a shelving assembly, and especially one that is suitable for use in stores to hold merchandise.

One object of my invention is to provide a shelving assembly having parts that can be assembled without using bolts or the like, and having base brackets that can be installed and removed, together with the shelving they support, independently of the remainder of the assembly.

Another object is to provide a shelving assembly having a protective plate at the front that will rest on an uneven floor when attached to the base brackets, and having leveling mechanism with said base brackets that can be adjusted to level the shelving and yet have the protective plate rest on said floor.

Another object is to provide a shelving assembly having two upright standards at opposite extremities that support shelf brackets extending in opposite directions, and a back plate, which standards are of simple structure and permit ready mounting of said brackets thereon as well as their removal.

A further object is to provide a shelving assembly with improved base brackets whereby they may easily be connected to and disconnected from said upright standards, and to which a protective plate and cover members can easily be connected and removed, independently of other parts of the assembly.

The foregoing and other objects which will appear as the nature of the invention is better understood, may be accomplished by a construction combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Fig. 2 is a front elevational view of the back plate before the tongues are bent.

Fig. 3 is a sectional view taken on the line 3—3 of Fig. 2.

Fig. 4 is a sectional view taken on the line 4—4 of Fig. 2; but showing a tongue bent back.

Fig. 5 is a sectional view taken on line 5—5 of Fig. 2.

Fig. 6 is a perspective view of an upright standard used in my assembly.

Fig. 7 is a side elevational view of a base bracket looking at the inner surface thereof.

Fig. 8 is a top plan view of said base bracket.

Fig. 9 is a front end elevational view of said base bracket.

Fig. 10 is a sectional view taken on the line 10—10 of Fig. 1.

Fig. 11 is a fragmentary, rear elevational view showing the protector plate and base bracket in assembled position.

Fig. 12 is a sectional view taken on the line 12—12 of Fig. 11.

Fig. 13 is a side elevational view of an upper or regular bracket looking at the inner surface thereof.

Fig. 14 is a sectional view taken on the line 14—14 of Fig. 13.

Fig. 15 is a side elevational view of the cover plate for the base bracket looking at the outer surface thereof.

Fig. 16 is a sectional view taken on the line 16—16 of Fig. 15.

Fig. 17 is a front elevational view of the protector plate for the assembly, looking at the inner surface thereof.

Fig. 18 is a sectional view taken on the line 18—18 of Fig. 17.

Fig. 19 is a fragmentary, perspective view of the protective plate looking towards the inner surface thereof.

Fig. 20 is a sectional view taken on the line 20—20 of Fig. 1.

Figure 1:
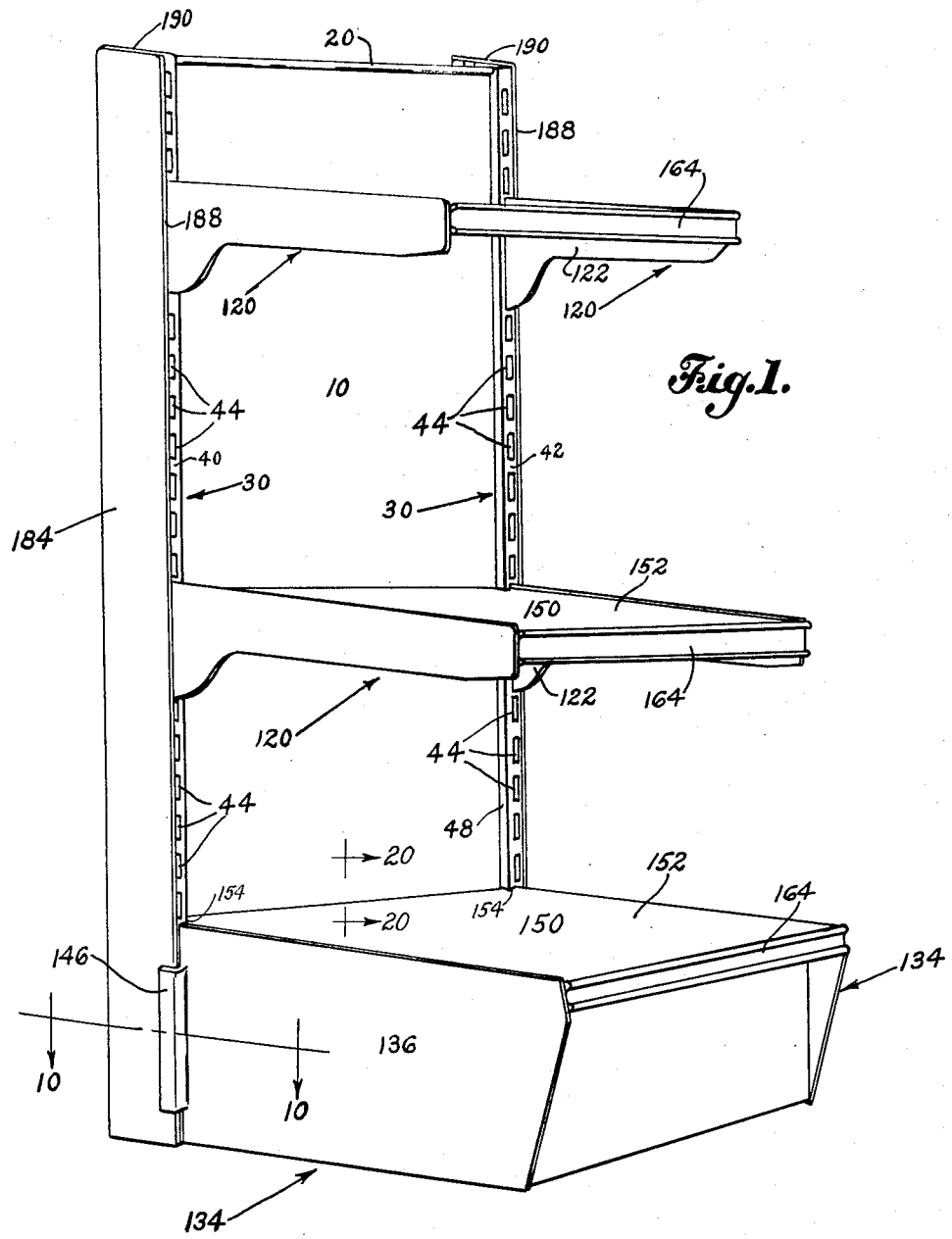
Fig. 1 is a perspective view of an assembly of shelving embodying my invention.

As illustrated, my assembly has a back 10, shown as a metal plate, which ordinarily does not extend to the floor. From its face portion as shown in said Fig. 2 this back plate 10 has a rearwardly extending left offset portion 12 and a forwardly extending right offset portion 14, both of which have cut-outs 16 therein. It also has an upturned, open-hem flange 18 at the bottom to receive a shelf, later described, and a rolled hem flange 20 at the top. Tongues 22, spaced apart, extend forwardly from said left offset portion 12, and similar tongues 24 extend rearwardly from said right offset portion 14, which tongues 22 and 24 have undercut slots 26 therein. Said tongues are located at intermediate points in said cut-outs 16 and they extend into slots in upright standards later described. Said tongues 22 and 24 would both extend forwardly when an assembly has all its shelves extending in the same direction.

An upright standard 30 is intended to rest on the floor. It has a central portion 32 having vertically extending, longitudinal slots 34 therein to receive said tongues 22 and 24 of said back. Connector portions 36 and 38 extend angularly from opposite ends of said central portion 32 in opposite directions. Supporting end portions 40 and 42 extend angularly from ends of said connector portions 36 and 38 respectively and are parallel. Each said end portion 40 and 42 has vertically extending, elongate slots 44 therein, into which tongues of shelf supporting brackets extend, later described. Said upright standards preferably terminate with inwardly extending, terminating portions 46 and 48 which extend from said supporting end portions 40 and 42 towards said central portion 32, being parallel with said connecting portions 36 and 38. Said upright standard 30 enables shelves, later described, to extend in opposite directions from said back 10.

A base bracket 52 for supporting a shelf has a main body 54 having dimples 56 therein that extend outwardly to space it somewhat from a cover member later described. It has a hole 58 therethrough to receive an electric cable, and an embossed portion 60 to add strength. A supporting flange 62 at the top extends inwardly upon which a portion of a shelf, later described, rests. Also it has a longer reinforcing flange 64 at the bottom extending inwardly and terminating rearwardly adjacent a said standard.

Said base bracket 52 has an offset portion 66 extending rearwardly and inwardly in which there is a cut-out 68 for a locking member tongue 70 to slide therethrough. Said tongue 70 is attached to a body portion 72 having a closed slot 74 therein and from which a finger portion 76 extends at a right angle. A pin member shown as a rivet 78 loosely extends through said base bracket body 54 and through said slot 74, being headed over outside said slot, thus permitting said body 72, with said tongue 70, to slide inwardly beyond said cut-out 68, and also in the opposite direction. This locking member thus can lock said base bracket 52 against removal from said upright standard 30.

Tongues 80 extend rearwardly from said offset portion 66, and have cut-outs 82 extending upwardly at the inner, lower ends of said tongues 80, into which cut-outs 82 said upright standard end portions 40 and 42 enter at the points beyond the lower edges of said slots 44. Thus said base bracket 52 rests by gravity on said upright standard and is easily removable therefrom when desired. Said locking tongue 70 slides into locking position above a said tongue 80, in which position said base bracket 52 cannot be separated from said standard.

Spaced inwardly and extending rearwardly from said tongues 80 in a bearing portion 84 that bears against one or the other of said inwardly extending, terminating portions 46 and 48 and one or the other connector portions 36 and 38 of said upright standard 30. It terminates just above the lowest said tongue 80. Another bearing portion 86 above said teeth 80 extends rearwardly and it has a supporting flange portion 88 that extends at a right angle to, and inwardly from, said bearing portion 86, serving as a support for the rear part of a base shelf, later described, holding the latter in place.

A projecting member 90 extends forwardly from said bracket body 54 and upwardly above it, upon which rests the front part of a shelf, later described. This member 90 has an elongate slot 91 therein to use with a cover plate, later described.

An inwardly extending front flange 92 extends at a right angle to the front of said body 54, being below said projecting member 90. This flange 92 has a vertical tooth 94 at its upper end to connect with a protective plate, later described, and a vertical slot 96 is thus provided between said tooth 94 and said body 54.

A vertical tooth 98 extends forwardly and inwardly from the lower front of said body 54, leaving a space 100 between this tooth 98 and said body 54 into which said protective plate enters.

A vertical recess 104 is formed in said body 54 commencing in said lower flange 64 and extending in said body from the lower edge upwardly and spaced inwardly from the front edge thereof. An opening 106 formed in said body 54 at the lower edge of said recess provides tabs 108 extending inwardly, which opening 106 receives a nut 110 screw-threadedly connected to a leveling bolt 112 that fits in said recess and has a flat head 114 at its lower end that underlies said lower flange 64 and normally touches on the floor.

An intermediate shelf bracket 120 has a body portion 122 having a lower reinforcing portion 124 embossed therein upon which part of a shelf, later described, rests. It has an upper tongue 126 which extends rearwardly of said body 122 that fits into a said upright standard slot 44. There is a slot 128 below said tongue 126 and a lower tongue 130 also fits into a said slot 44.

A cover member, shown as a flat plate 134, fits on said base bracket 52. It has a body portion 136 in which a recess 138 is formed that is opposite said bracket recess 104 and it receives a portion of said leveling bolt 112. It also has an opening 139 that receives a portion of said nut 110. Two tongues 142 extend rearwardly into said upright standard slots 44. A flange 144 extends outwardly from said body 136 at a right angle, from which an offset flange 146 extends rearwardly parallel with said body 136, and is positioned outside said base bracket 52 in position of use. Said body 136 has a hole 148 therein which lines up with said base bracket elongate slot 91 to connect the two parts together if desired.

A well-known shelf 150, of which many are often used in a shelving assembly, has a body 152 supported by a pair of said brackets. An angular end of said body extends into said open-hem flange 18 as shown in said Fig. 20. In said body are two rear cut-outs 154 at opposite sides which enable the shelf body to bear against a said upright standard supporting end, 40 or 42, or a said connector portion 36 and 38 and also rest on said bracket supporting flange 88. A tag moulding or holder 164 is attached to said shelf.

A protective plate 168, at the front of said assembly of shelving, has a body 170 having a rearwardly extending upper flange 172 in which two elongate slots 174 are formed to receive two vertical teeth 94 of two said brackets 52. At the lower end of said protective plate 168 is a rearwardly turn-back portion 176 from which a flange 178 extends rearwardly, having two elongate slots 18 therethrough directly opposite said slots 174 which receive two of said vertical teeth 98 of two said brackets 52. There are cut-outs 182 at four corners of said body 170, from which said flange 172 and said flange 178 commence, the lower ones of which permit said base bracket lower flange 64 to rest thereon. The lower extremity of said protective plate rests on the floor.

Said floors that receive my shelving assembly often are uneven, and since it is important to have the shelving level, said leveling bolt 112 is moved to effect such leveling. Thereupon said protective plate 168 is placed in position with said bracket teeth 94 and 98 extending into its said slots 174 and 189 whatever distance is permitted and still have the protective plate resting on the floor.

A finish plate 184 may be used to cover the outside surfaces of said upright standards 30 at the side extremities of the assembly. This plate 184 has flanges 186 and 188 at opposite sides extending inwardly, in position of use, and a flange 190 at the top extending inwardly.

What I claim is:

1. A shelving assembly comprising two upright standards each having slots in end portions thereof, a back connected to said upright standards, a shelf, two brackets connected to said standards and each embodying tongues extending rearwardly and entering said slots, and bearing portions spaced inwardly from said tongues and bearing against said upright standards, said shelf resting on and extending between said brackets, and cover members for said brackets each embodying a flange extending outwardly, an offset flange extending at an angle and rearwardly therefrom, outside of and adjacent said standards, and tongues above and below said flanges extending into said slots of said standards.

2. A shelving assembly comprising two upright standards each having slots in end portions thereof, a back connected to said upright standards, a shelf, two brackets connected to said standards and each embodying tongues extending rearwardly and entering said slots, and bearing portions spaced inwardly from said tongues and bearing against said upright standards, said shelf resting on and extending between said brackets, and cover members for said brackets each embodying a flange extending outwardly, an offset flange extending at an angle and rearwardly therefrom and outside of and adjacent said standards, and tongues above and below said flanges extending into said slots, said bracket tongues having cut-outs extending from their forward and lower extremities upwardly and into which extend portions of said standards defining said slots.

3. A shelving assembly comprising two upright standards each having slots in end portions thereof, a back connected to said upright standards, a shelf, two brackets connected to said standards each embodying tongues extending rearwardly and entering said slots and each said bracket having a vertically extending recess in a lower portion thereof and an opening through said bracket below and in communication with said recess, a screw-threaded bolt in said recess embodying a head below said bracket adapted to rest on a floor, a nut screw-threadedly connected to said bolt and extending into said opening, and a protective plate at the front of said assembly connected to said brackets and adapted to rest on said floor, said shelf extending between and supported by said brackets.

4. A shelving assembly comprising two upright standards each having slots in end portions thereof, a back connected to said upright standards, a shelf, two brackets connected to said standards each embodying tongues extending rearwardly and entering said slots and each said bracket having a vertically extending recess in a lower portion thereof and an opening through said bracket below and in communication with said recess, two tabs extending inwardly from said opening, a screw-threaded bolt in said recess embodying a head below said bracket adapted to rest on a floor, a nut screw-threadedly connected to said bolt and extending into said opening, said tabs bearing against said nuts, and a protective plate at the front of said assembly connected to said brackets and adapted to rest on said floor, said shelf extending between and supported by said brackets.

5. A shelving assembly comprising two upright standards each having slots in end portions thereof, a back connected to said upright standards, a shelf, two brackets connected to said standards each embodying tongues extending rearwardly and entering said slots and each said bracket having a vertically extending recess in a lower portion thereof and an opening through said bracket below and in communication with said recess, a screw-threaded bolt in said recess embodying a head below said bracket adapted to rest on a floor, a nut screw-threadedly connected to said bolt and extending into said opening, a protective plate at the front of said assembly connected to said brackets and adapted to rest on said floor, and cover members for said brackets each having a recess therein opposite said recesses in said brackets and an opening therethrough opposite said bracket opening, each said bolt and nut extending into said cover member recesses and openings respectively, said shelf extending between and supported by said brackets.

6. A shelving assembly comprising two upright standards each having slots in end portions thereof, a back connected to said upright standards, a shelf, two brackets connected to said standards each embodying tongues extending rearwardly and entering said slots and an inwardly extending bottom flange, said bottom flange and each said bracket having a vertically extending recess in a lower portion thereof, said bracket having an opening through and below and in communication with said recess, a screw-threaded bolt in said recesses embodying a head below said bracket adapted to rest on a floor, and a nut screw-threadedly connected to said bolt and extending into said opening, and a protective plate at the front of said assembly connected to said brackets and adapted to rest on said floor, said shelf extending between and supported by said brackets.

7. A shelving assembly comprising two upright standards each having slots in opposite end portions thereof and having slots in a central portion thereof spaced from said end portions, a back between said standards having tongues at one side that extend forwardly and tongues at the opposite side that extend rearwardly, said tongues extending into said central portion slots to thereby connect said back to said standards, a shelf, two brackets connected to said standards and each embodying tongues extending rearwardly and entering said end portion slots, said shelf resting on and extending between said brackets.

8. A shelving assembly comprising two upright standards each embodying a central portion having slots therethrough, two connector portions extending angularly in opposite directions from said central portion in different vertical planes in position of use, and two end portions extending angularly from said connector portions and having slots therethrough, two pairs of brackets connected to said standards, said brackets extending in opposite directions and each embodying tongues extending rearwardly and entering said end portion slots of said two upright standards, a back between said standards, embodying tongues at opposite sides extending in opposite directions into said central portion slots, and shelves extending between and resting on said brackets.

9. A shelving assembly comprising two upright standards each embodying a central portion having slots therethrough, two connector portions extending angularly in opposite directions from said central portion in different vertical planes in position of use, and two end portions extending angularly from said connector portions and having slots therethrough, said central and end portions being in substantially the same vertical plane in position of use, two pairs of brackets connected to said standards, said pairs extending in opposite directions and each embodying tongues extending rearwardly and entering said end portion slots of said two upright standards, a back between said standards embodying tongues at opposite sides extending in opposite directions into said central portion slots, and shelves extending between and resting on said brackets.

10. A shelving assembly comprising two upright standards each embodying a central portion having slots therethrough, two connector portions extending angularly in opposite directions from said central portion in different vertical planes in position of use, two end portions extending angularly from said connector portions and having slots therethrough and two terminating portions extending from said end portions angularly toward said central portion, two pairs of brackets connected to said standards, said pairs extending in opposite directions and each embodying tongues extending rearwardly and entering said end portion slots of said two upright standards and embodying bearing portions spaced inwardly from said tongues and bearing against said terminating portions, a back between said standards embodying tongues at opposite sides extending in opposite directions into said central portion slots, and shelves extending between and resting on said brackets.

11. A shelving assembly comprising two upright standards each embodying a central portion having slots therethrough, two connector portions extending angularly in opposite directions from opposite end extremities of said central portion, two end portions extending angularly from opposite end extremities of said connector portions and being in substantially the same vertical plane in position of use, a back connected to said upright standards extending between said central portion and said end portions and embodying tongues at opposite sides extending into said central portion slots, two pairs of brackets extending in opposite directions and each embodying tongues extending rearwardly and entering said end portion slots of said two upright standards, and shelves extending in opposite directions from said back and extending between and resting on said brackets.

12. A shelving assembly comprising two upright standards each having slots in end portions thereof, a back connected to said upright standards, a shelf, two brackets each embodying tongues extending rearwardly and entering said slots, said shelf resting on and extending between said brackets, each said bracket having a cut-out therein, a locking member embodying a tongue slidable in said cut-out to a locking position directly in alinement with said tongue cut-outs and means slidably attaching said locking member to said bracket.

13. A shelving assembly comprising two upright standards each having slots in end portions thereof, a back connected to said upright standards, a shelf, two brackets each embodying tongues extending rearwardly and entering said slots and having cut-outs therein to receive portions of said standards, said shelf resting on and extending between said brackets, each said bracket embodying a pin member extending therethrough and each said bracket having a cut-out therein, a locking member embodying a tongue slidable in said cut-out to a locking position directly in alinement with said tongue cut-outs and having a slot spaced from said tongue, said pin member extending through said slot whereby said locking member may be slidably retained in said slot.

14. A shelving assembly comprising two upright standards each having slots in end portions thereof, a back connected to said upright standards, a shelf, two brackets each embodying an offset portion extending inwardly and rearwardly, tongues extending rearwardly from said offset portion and entering said slots, said shelf resting on and extending between said brackets, each said bracket embodying a pin member extending therethrough and said offset portion having a cut-out therein, a locking member embodying a tongue slidable in said cut-out to a locking position directly in alinement with said tongue cut-outs and having a slot spaced from said tongue, said pin member extending through said slot whereby said locking member is slidably retained in said slot.

15. A shelving assembly comprising two upright standards each having slots in end portions thereof, a back connected to said upright standards, a shelf, two brackets connected to said standards each embodying tongues extending rearwardly and entering said slots, a projecting member extending upwardly and forwardly beyond the remainder of said bracket, an inwardly extending flange at the front of each said bracket and rearwardly of and below said projecting member, a tooth extending upwardly from said flange, another and lower tooth extending from said flange adjacent the bottom of said bracket upwardly, a protective plate embodying a rearwardly extending upper flange having two openings therein at opposite side portions, and a rearwardly extending lower flange having two openings therein at opposite side portions, said upwardly extending teeth of both said brackets extending into said upper and lower flange openings, said shelf extending to and between and resting upon both said projecting members and supported by said brackets.

16. A shelving assembly comprising two upright standards each embodying a central portion, two connector portions extending angularly in opposite directions from said central portion in different vertical planes in position of use, and two end portions extending angularly from said connector portions and having slots therethrough, two pairs of brackets connected to said standards, said brackets extending in opposite directions and each embodying tongues extending rearwardly and entering said end portion slots, a back between said standards, means attaching said back to said central portions of said standards, and shelves extending between and resting on said brackets.

17. In combination, two upright standards spaced apart, each embodying, in position of use, a central portion having an opening therein, two connecting portions extending angularly in opposite directions from said central portion in different vertical planes, in position of use, and two end portions extending angularly from said connecting portions in opposite directions, a back between said standards embodying tongues at opposite sides extending angularly from said back and entering said central portion openings in said standards.

18. In combination, two upright standards spaced apart, each embodying, in position of use, a central portion having an opening therein, two connecting portions extending angularly in opposite directions from said central portion in different vertical planes, in position of use, and two end portions extending angularly from said connecting portions in opposite directions, a back between said standards embodying tongues at opposite sides extending angularly from said back and entering said central portion openings in said standards, said tongues having undercut slots, portions of said standards extending into said slots.

19. In combination, two upright standards spaced apart, each embodying, in position of use, a central portion having an opening therein, two connecting portions extending angularly in opposite directions from said central portion in different vertical planes, in position of use, and two end portions extending angularly from said connecting portions in opposite directions, a back between said standards embodying tongues at opposite sides extending angularly from said back and entering said central portion openings in said standards, said back extending substantially parallel with said central portions.

References Cited in the file of this patent

UNITED STATES PATENTS

| | | |
|---|---|---|
| 989,849 | Kennedy | Apr. 18, 1911 |
| 2,191,701 | Wood | Feb. 27, 1940 |
| 2,693,884 | Gurries | Nov. 9, 1954 |
| 2,787,382 | Williams | Apr. 2, 1957 |
| 2,872,049 | Slater | Feb. 3, 1959 |

FOREIGN PATENTS

| | | |
|---|---|---|
| 1,149,575 | France | July 15, 1957 |

UNITED STATES PATENT OFFICE

CERTIFICATE OF CORRECTION

Patent No. 2,956,688                  October 18, 1960

Francis J. Galassi

It is hereby certified that error appears in the printed specification of the above numbered patent requiring correction and that the said Letters Patent should read as corrected below.

Column 3, line 15, for "in" read -- is --; column 6, lines 65 and 66, strike out "and having cut-outs therein to receive portions of said standards,".

Signed and sealed this 25th day of April 1961.

(SEAL)
Attest:

ERNEST W. SWIDER
Attesting Officer

DAVID L. LADD
Commissioner of Patents